(12) United States Patent
Yokoyama

(10) Patent No.: US 10,203,468 B2
(45) Date of Patent: Feb. 12, 2019

(54) LENS APPARATUS

(71) Applicant: CANON KABUSHIKI KAISHA, Tokyo (JP)

(72) Inventor: Akira Yokoyama, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 194 days.

(21) Appl. No.: 15/237,971

(22) Filed: Aug. 16, 2016

(65) Prior Publication Data

US 2017/0059809 A1    Mar. 2, 2017

(30) Foreign Application Priority Data

Aug. 31, 2015  (JP) .................................. 2016-170051

(51) Int. Cl.
*G02B 7/02* (2006.01)
*G02B 7/04* (2006.01)
*G02B 7/08* (2006.01)

(52) U.S. Cl.
CPC ........ *G02B 7/04* (2013.01); *G02B 7/08* (2013.01)

(58) Field of Classification Search
CPC ... G02B 7/04; G02B 7/10; G02B 7/02; G02B 7/08
See application file for complete search history.

(56) References Cited

U.S. PATENT DOCUMENTS

| 6,201,650 B1 | 3/2001 | Jonas et al. | |
| 7,466,504 B1* | 12/2008 | Koyama | G02B 7/102 359/819 |
| 2006/0034001 A1* | 2/2006 | Nagai | G02B 7/102 359/694 |
| 2006/0056078 A1* | 3/2006 | Nomura | G02B 7/102 359/811 |

FOREIGN PATENT DOCUMENTS

| JP | H02006915 A | 1/1990 |
| JP | H0753053 Y2 | 12/1995 |
| JP | 2009251265 A | 10/2009 |
| JP | 2010145432 A | 7/2010 |
| JP | 2011169954 A | 9/2011 |
| JP | 2012220866 A | 11/2012 |

OTHER PUBLICATIONS

English translation provided by Examiner of Masami (JP 20120220866 A, of record).*
Office Action issued in Japanese Appln. No. 2015170051 dated Jan. 9, 2018.

* cited by examiner

*Primary Examiner* — Bumsuk Won
*Assistant Examiner* — Balram T Parbadia
(74) *Attorney, Agent, or Firm* — Rossi, Kimms & McDowell LLP

(57) ABSTRACT

A lens apparatus includes a can ring for moving an optical member in an optical axis direction by rotating about an optical axis relative to a fixed barrel. One end surface of the cam ring in the optical axis direction is in contact with a first ball array, while an opposite end surface of the cam ring in the optical axis direction is in contact with a second ball array, the first ball array is rotatably held by and between a ring member movable in the optical axis direction and the one end surface, the second ball array is rotatably held by and between a cap member fixed to the fixed barrel and the opposite end surface, and the ring member is biased by an elastic member toward the cam ring, and the cam ring is thereby biased toward the cap member.

8 Claims, 4 Drawing Sheets

LENS APPARATUS

BACKGROUND OF THE INVENTION

Field of the Invention

The present invention relates to a lens apparatus, and particularly a lens apparatus including a cam mechanism for driving an optical member in an optical axis direction.

Description of the Related Art

A lens apparatus is provided with multiple lenses, such as a magnification lens and a focus lens, which are movable in an optical axis direction. The lens apparatus is generally provided with a mechanism for: rotating a cam ring using a motor or the like; and moving the lenses in the optical axis direction using a cam formed on the cam ring. The lens apparatus is further provided with a mechanism for rotating the cam ring, which is linked to an operation ring using a linkage member, when the operation ring is rotationally manipulated.

In a conventional practice, play small enough to have no influence on the optical performance is generally provided between the cam ring and a fixed barrel rotatably supporting the cam ring. Nowadays, as the number of pixels in an imaging sensor becomes larger, a permissible circle of confusion becomes smaller. In recent years, there have been a demand that backlash particularly in the optical axis direction be reduced to as close to zero as possible.

Japanese Patent Application Laid-Open No. 2010-145432 proposes a structure for preventing backlash from occurring around the optical axis due to the play, in which: at their one ends, a cam ring and a fixed barrel include tapered contact surfaces; at their opposite ends, a member for positioning the cam ring is provided; and a spring biases the cam ring in the optical axis direction. In addition, Japanese Patent Application Laid-Open No. H2-6915 proposes a structure for preventing backlash from occurring in the optical axial direction and around the optical axis, by providing an elastic member between a cam ring and a fixed barrel.

According to the conventional technique disclosed in Japanese Patent Application Laid-Open No. 2010-145432, the cam member is biased toward the tapered surface. Thus, the contact between the tapered surfaces makes a sliding area between them larger than the contact between vertical surfaces. Accordingly, the technique disclosed therein involves a risk of an increase in resistance due to the biasing, and a risk of an increase in operation torque. Meanwhile, Japanese Patent Application Laid-Open No. H2-6915 involves a risk of an increase in operation torque, because load is applied to sliding surfaces in the optical axis direction and around the optical axis.

As described above, since the cam ring of the lens apparatus is driven by the motor, an increase in operation torque may lead to an increase in size of the motor, which in turn invites an increase in costs and an increase in noise.

SUMMARY OF THE INVENTION

Against this background, an object of the present invention is to provide a lens apparatus capable of inhibiting backlash of a cam ring in an optical axis direction; and concurrently preventing an increase in torque due to the inhibiting of backlash.

For the purpose of achieving the above object, a lens apparatus according to the present invention is a lens apparatus including a cam ring for moving an optical member in an optical axis direction by rotating about an optical axis relative to a fixed barrel. One end surface of the cam ring in the optical axis direction is in contact with a first ball array, while an opposite end surface of the cam ring in the optical axis direction is in contact with a second ball array, the first ball array is rotatably held by and between a ring member movable in the optical axis direction and the one end surface, the second ball array is rotatably held by and between a cap member fixed to the fixed barrel and the opposite end surface, and the ring member is biased by an elastic member toward the cam ring, and the cam ring is thereby biased toward the cap member.

According to the present invention, it is possible to provide a lens apparatus capable of: inhibiting backlash of a cam ring in an optical axis direction; and concurrently preventing an increase in torque due to the inhibiting of backlash.

Further features of the present invention will become apparent from the following description of exemplary embodiments with reference to the attached drawings.

DESCRIPTION OF THE EMBODIMENTS

Figure 1:
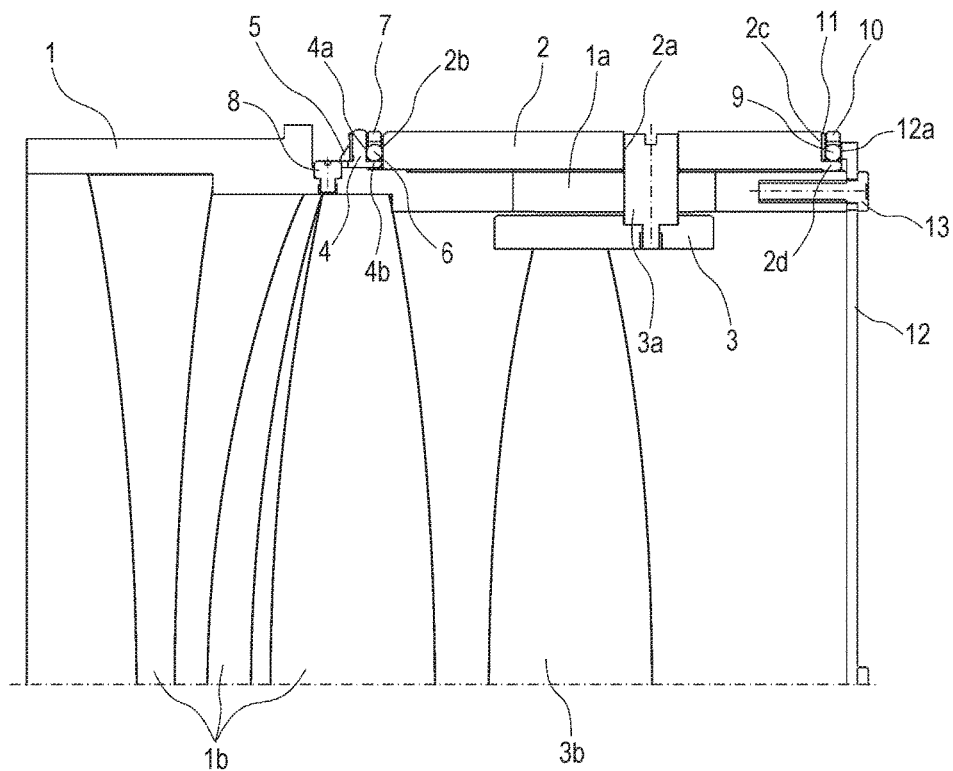
FIG. 1 is a cross-sectional diagram showing an exemplary configuration of a lens apparatus of the present invention.

Preferred embodiments of the present invention will now be described in detail in accordance with the accompanying drawings. FIG. 1 is a cross-sectional diagram of a lens apparatus of an embodiment of the present invention.

EXAMPLES

Descriptions will be hereinbelow provided for a lens apparatus of an embodiment of the present invention referring to FIGS. 1 to 7.

FIG. 1 is the cross-sectional diagram of die lens apparatus of the embodiment of the present invention.

A fixed barrel 1 is provided with at least one straight groove 1a, and fixed lenses 1b are appropriately fixed to the fixed barrel 1. A cam ring 2 is rotatably fitted in an outer periphery of the fixed barrel 2. A movable lens barrel 3 is integrally provided with a cam pin 3a in engagement with the straight groove 1a and an inclined groove 2a of the cam ring 2. Rotation of the cam ring 2 changes an optical-axis-direction position of a movable lens 3b (an optical member) fixed to the movable lens barrel 3.

A front end (a left end in FIG. 1) of the cam ring 2 in a direction of insertion of the cam ring 2 into the fixed barrel 1 is provided with a first surface 2b (one end surface) almost vertical to the optical axis. A second surface 2c (an opposite end surface) almost vertical to the optical axis is provided in the vicinity of a rear end (a right end in FIG. 1) of the cam ring 2 in the direction of insertion of the cam ring 2 into the fixed barrel 1.

A ring member 4 is provided between the fixed barrel 1 and the first surface 2b. The ring member 4 is fitted in the fixed barrel 1. A wave washer 5 biases the ring member 4 toward the cam ring 2. A first ball array 6 including multiple balls with almost the same diameter is placed in contact with a surface 4a of the ring member 4 which faces and is almost parallel to the first surface 2b of the cam ring 2. A first rolling diameter portion 4b, which is an extension in the optical axis direction of an inner-diameter-side part of the surface of the ring member 4 facing the cam ring 2, is provided on an inner-diameter side of the first ball array 6. A ring-shaped first retainer 7 for retaining spaces between the balls in the first ball array 6 is provided on an outer-diameter side of the first ball array 6. The first retainer 7 includes multiple U-shaped holes (U-shaped concave portions) around the optical axis in its inner-diameter surface (its surface facing the first rolling diameter portion 4b). In this case, the first ball array 6 is in contact with the ring member 4 and the first surface 2b of the cam ring 2. When the cam ring 2 rotates, the balls included in the first ball array 6 roll between the ring member 4 (the surface 4a) and the cam ring (the first surface 2b). In other words, the first ball array 6 is rotatably held by and between the ring member 4 movable in the optical axis direction and the first surface 2b (the one end surface) of the cam ring 2. The first retainer 7, together with the first rolling diameter portion 4b, restricts the movement of the first ball array 6 in a radial direction.

A rotation preventive pin 8 restricts the rotational motion of the ring member 4 about the optical axis relative to the fixed barrel 1, and prevents the first ball array 6 from sliding over the ring member 4.

A second ball array 9 including multiple balls with almost the same diameter is placed in contact with the second surface of the cam ring 2. A second rolling diameter portion 2d, which is an extension in the optical axis direction of an inner-diameter-side part of a surface of the cam ring 2 facing a cap member 12 (described later), is provided on an inner-diameter side of the second ball array 9. A ring-shaped second retainer 10 for retaining spaces between the balls in the second ball array 9 is provided on an outer-diameter side of the second ball array 9. The second retainer 10 includes multiple U-shaped holes (U-shaped concave portions) around the optical axis in its inner-diameter surface facing the second rolling diameter portion 2d). In this case, a washer 11 is inserted between the second surface 2c and the second ball array 9. This prevents the second surface 2c of the cam ring 2 from being damaged or deformed if the material of the balls included in the second ball array 9 is harder than that of the cam ring 2.

The cap member 12 is fixed to the fixed barrel 1 using a screw 13, and includes a surface 12a which is almost parallel to the second surface 2c of the cam ring 2. The second ball array 9 is in contact with the second surface 2c of the cam ring 2 and the surface 12a of the cap member 12. When the cam ring 2 rotates, the balls included in the second ball array 9 roll between the cap member 12 and the cam ring 2. In other words, the second ball array 9 is rotatably held by and between the cap member 12 fixed to the fixed barrel 1 and the second surface 2c (the opposite end surface) of the cam ring 2. The second retainer 10, together with the second rolling diameter portion 2d, restricts the movement of the second ball array 9 in the radial direction.

Figure 2A:
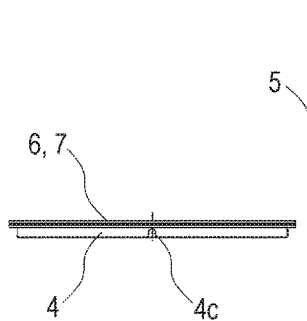
FIG. 2A is a diagram showing a first state of assembling the lens apparatus of the present invention.
Figure 2B:
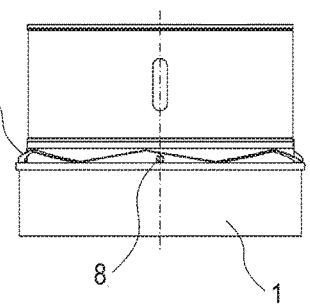
FIG. 2B is a diagram showing the first state of assembling the lens apparatus of the present invention.
Figure 2C:
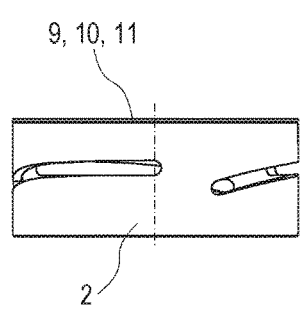
FIG. 2C is a diagram showing the first state of assembling the lens apparatus of the present invention.

FIGS. 2A, 2B, and 2C are diagrams showing a first state of assembling the lens apparatus of the present invention.

The wave washer 5 is embedded in the fixed barrel 1 shown in FIG. 2B. The rotation preventive pin 8 is fixed to the fixed barrel 1.

As shown in FIG. 2A, the ring member 4 has a shape which enables the ring member 4 to be placed on an almost horizontal surface with a direction of extension of the first rolling diameter portion 4b pointing upward. The ring member 4 is placed with the surface of the ring member 4 facing the cam ring 2 faced upward. Subsequently, the first retainer 7 is placed on the ring member 4. After that, the first ball array 6 is placed into the holes in the first retainer 7. In this case, the balls included in the first ball array 6 are retained on the ring member 4 with inner-diameter sides of the balls restricted by the first rolling diameter portion 4b, and with outer-diameter sides of the balls restricted by the retainer 7.

As shown in FIG. 2C, the cam ring 2 has a shape which enables the cam ring 2 to be placed on an almost horizontal surface with a direction of extension of the second rolling diameter portion 2d pointing upward. The cam ring 2 is placed with its front end in the insertion direction faced downward, and with its second surface 2c faced upward. After the washer 11 and the second retainer 10 are placed on the cam ring 2, the second ball array 9 is placed into the holes in the second retainer 10. In this case, the balls included in the second ball array 9 are retained on the cam ring 2 with inner-diameter sides of the balls restricted by the second rolling diameter portion 2d, and with outer-diameter sides of the balls restricted by the retainer 10.

Figure 3:
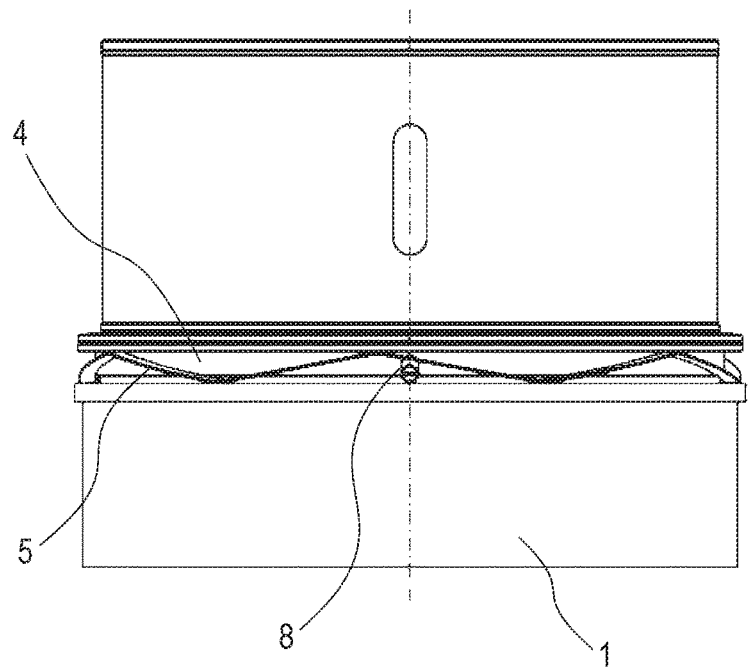
FIG. 3 is a diagram showing a second state of assembling the lens apparatus of the present invention.

FIG. 3 is a diagram showing a second state of assembling the lens apparatus of the present invention.

FIG. 3 shows the state in which the ring member 4 is fitted in the fixed barrel 1 with the first ball array 6 and the first retainer 7 placed on the ring member 4. In this case, the phase of the ring member 4 is adjusted in order that the rotation preventive pin 8 can be fitted in a groove 4c provided to the ring member 4. Furthermore, the ring member 4 is in contact with the wave washer 5.

Figure 4:
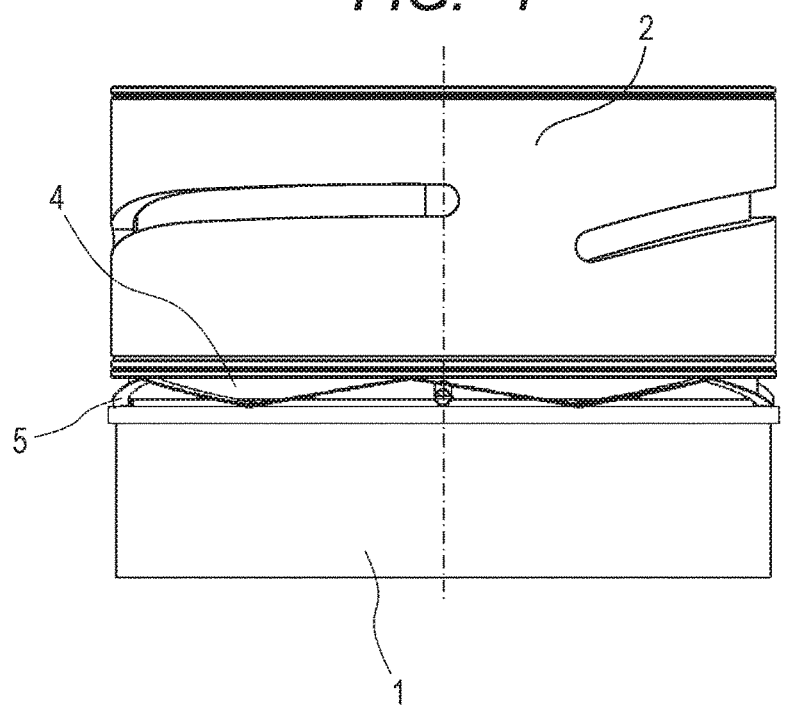
FIG. 4 is a diagram showing a third state of assembling the lens apparatus of the present invention.

FIG. 4 is a diagram showing a third state of assembling the lens apparatus of the present invention.

The cam ring 2 is fitted onto the fixed barrel 1 with the second ball array 9, the second retainer 10 and the washer 11 placed on the cam ring 2. In this case, the first surface 2b of the cam ring 2 is in contact with the first ball array 6.

Figure 5:
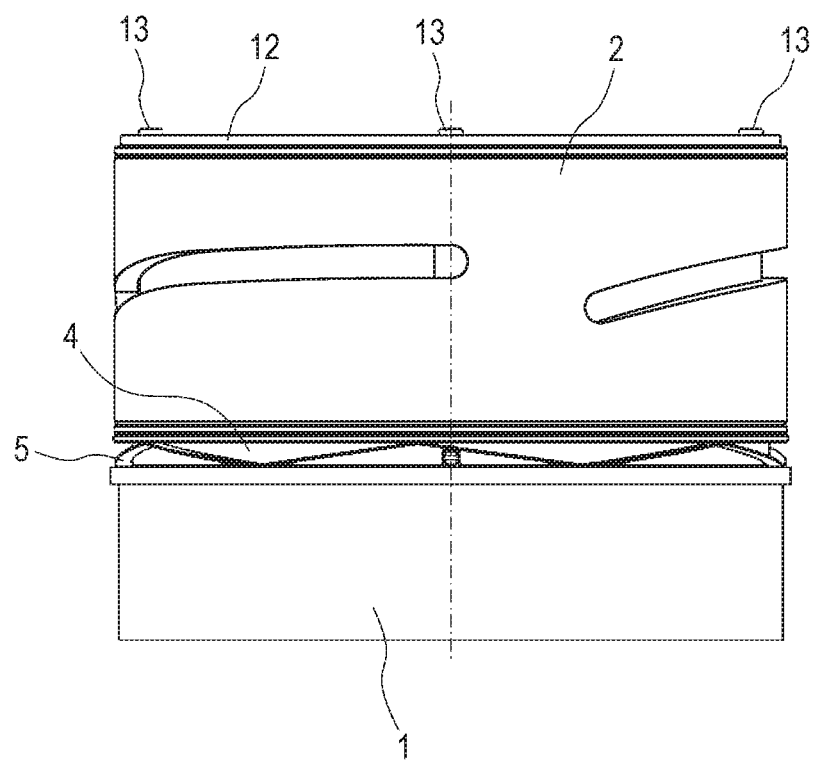
FIG. 5 is a diagram showing a fourth state of assembling the lens apparatus of the present invention.
Figure 6:
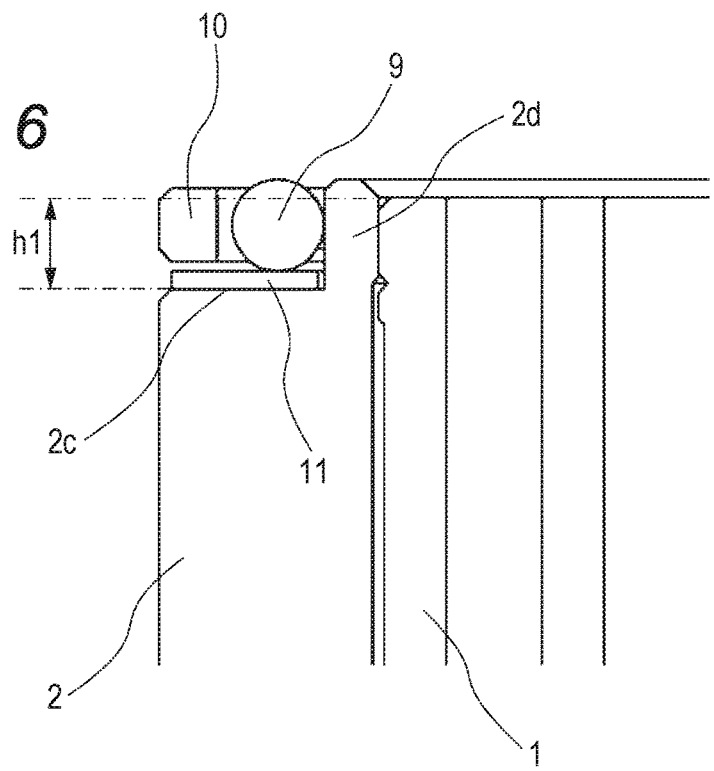
FIG. 6 is a diagram showing a relationship between heights of a fixed barrel and a cam ring in the third state.
Figure 7:
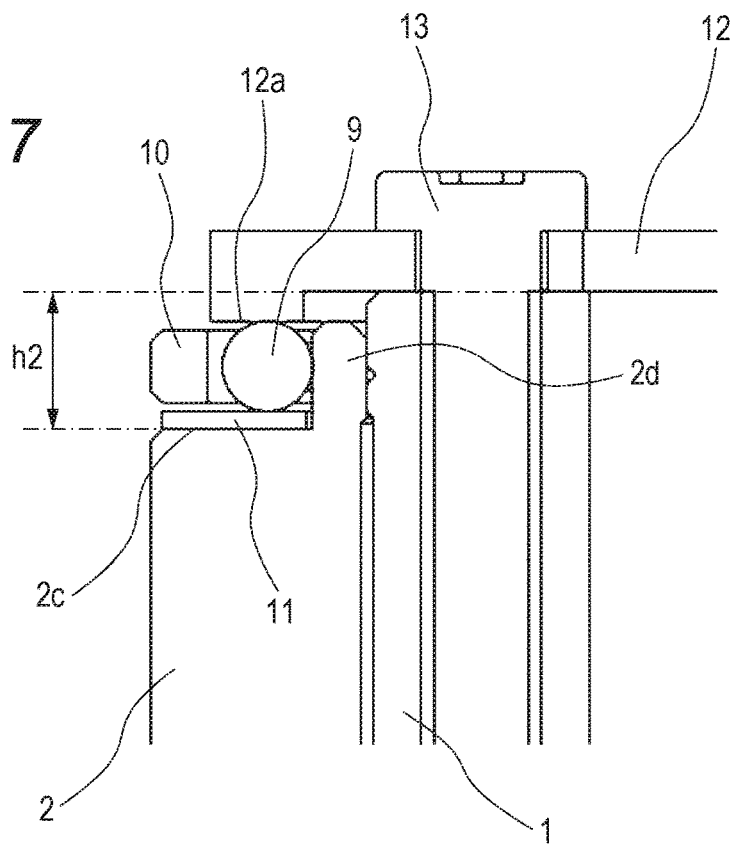
FIG. 7 is a diagram showing a relationship between heights of the fixed barrel and the cam ring in the fourth state.

FIG. 5 is a diagram showing a fourth state of assembling the lens apparatus of the present invention.

The cap member 12 is fixed to the fixed barrel 1 using the screws 13. In this case, a step h1 between the end surface of the fixed barrel 1 and the cam ring 2 in the third state shown in FIG. 6 changes into a step h2 therebetween in the fourth state shown in FIG. 7, because the cap member 12 pushes the cam ring 2 and the ring member 4 inward, which in turn compress the wave washer 5.

After the cap member 12 is attached to the fixed barrel 1, the direction of the fixed barrel 1 is changed, and internal components are installed in the fixed barrel 1 up to the state shown in FIG. 1. With this, the assembling of the lens apparatus is completed.

As described above, according to the lens apparatus of the present invention, the wave washer 5 always biases the cam ring 2 in the optical axis direction. For this reason, backlash of the cam ring 2 in the optical axis direction is restricted. In other words, the wave washer 5 as an elastic member biases the ring member 4 toward the cam ring, and the cam ring 2 is thereby biased toward the cap member. For this reason, the backlash of the can ring 2 in the optical axis direction is inhibited.

In addition, the ball arrays 6, 9 reduce rotational resistance in the biasing direction. For this reason, it is possible to prevent an increase in operation torque.

Furthermore, the assembling is carried out with a direction of exposure of the ball arrays 6, 9 always pointing upward. For this reason, the balls are less likely to be scattered during the assembling, and the assembling becomes easy.

Moreover, the assembled state is maintained by the attachment of the cap member 12. For this reason, during subsequent steps of the assembling, no attention need be paid to the direction of the lens apparatus. Accordingly, the assembling becomes easy.

Besides, parts of the cam ring 2 and the ring member 4 also serve to restrict the inner-diameter sides of the ball arrays 6, 9. For this reason, it is possible to prevent the balls from coming out of the ball arrays 6, 9, and to concurrently decrease components in number. Thereby, space and costs can be reduced from those needed to construct usual bearings.

In this case, the biasing member for biasing the cam ring 2 is not limited to the wave washer. Even when other biasing members such as a coil spring and rubber are instead used to bias the cam ring 2, the same effect can be obtained from them.

In addition, the configuration may be made such that: parts of the cam ring 2 and the ring member 4 restrict the movements of the outer-diameter sides of the ball arrays 6, 9 while the retainers restrict the movements of the inner-diameter sides of the ball arrays 6, 9.

Furthermore, although the embodiment employs the configuration in which the cam ring 2 is fitted on the outer peripheral side of the fixed barrel 1, the same effect can be obtained from a configuration in which the cam ring is fitted in the inner peripheral side of the fixed barrel.

Moreover, it is a matter of course that the application of lubricant such as grease to rolling parts of each ball array, as well as sliding parts of the cam ring, the ring member and the fixed barrel makes it possible to reduce the torque further, and to enhance the durability further.

Although the preferable embodiments of the present invention have been described, the present invention is not limited to these embodiments. Various modifications and changes may be made to the present invention within a scope not departing from the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-170051, filed Aug. 31, 2015, which is hereby incorporated by reference herein in its entirety.

What is claimed is:

1. A lens apparatus comprising:
   a fixed barrel;
   a cam ring for moving an optical member in an optical axis direction by rotating about an optical axis relative to the fixed barrel;
   a first ball array in contact with one end surface of the cam ring in the optical axis direction;
   a second ball array in contact with the other end surface of the cam ring in the optical axis direction;
   a ring member movable relative to the fixed barrel in the optical axis direction and arranged so that the first ball array is rotatably held between the ring member and the one end surface;
   a cap member fixed to the fixed barrel and arranged so that the second ball array is rotatably held between the cap member and the other end surface; and
   an elastic member biasing the ring member toward the cam ring to bias the cam ring toward the cap member.

2. The lens apparatus according to claim 1, wherein:
   the ring member includes a first portion, which is an extension in the optical axis direction, of at least one of an inner-diameter-side part or an outer-diameter-side part of a surface, facing the cam ring, of the ring member, and
   the first portion is configured to restrict movement of the first ball array in a radial direction of the ring member.

3. The lens apparatus according to claim 2, further comprising:
   a first retainer configured to retain balls included in the first ball array,
   wherein in a surface, facing the first portion, of the first retainer, concave portions are disposed about the optical axis to retain the balls, and
   wherein the first retainer and the first portion are configured to restrict movement of the first ball array in the radial direction.

4. The lens apparatus according to claim 2, wherein:
   the cam ring includes a second portion, which is an extension, in the optical axis direction, of at least one of an inner-diameter-side part or an outer-diameter-side part of a surface, facing the cap member, of the cam ring, and
   the second portion is configured to restrict movement of the second ball array in a radial direction of the cam ring.

5. The lens apparatus according to claim 4, further comprising:
   a second retainer configured to retain balls included in the second ball array,
   wherein in a surface, facing the second portion, of the second retainer, concave portions are disposed about the optical axis to retain the balls, and
   wherein the second retainer and the second portion are configured to restrict movement of the second ball array in the radial direction.

6. The lens apparatus according to claim 4, wherein the cam ring has a shape that enables the cam ring to be placed on a horizontal surface with a direction of the extension of the second portion pointing upward.

7. The lens apparatus according to claim 2, wherein the ring member has a shape that enables the ring member to be placed on a horizontal surface with a direction of the extension of the first portion pointing upward.

8. A camera system comprising an image pickup element and a lens apparatus configured to form an image on the image pickup element, wherein the lens apparatus comprises:
   a fixed barrel;
   a cam ring for moving an optical member in an optical axis direction by rotating about an optical axis relative to the fixed barrel;
   a first ball array in contact with one end surface of the cam ring in the optical axis direction;
   a second ball array in contact with the other end surface of the cam ring in the optical axis direction;

a ring member movable relative to the fixed barrel in the optical axis direction and arranged so that the first ball array is rotatably held between the ring member and the one end surface;

a cap member fixed to the fixed barrel and arranged so that the second ball array is rotatably held between the cap member and the other end surface; and an elastic member biasing the ring member toward the cam ring to bias the cam ring toward the cap member.

* * * * *